(12) United States Patent
Estragnat

(10) Patent No.: US 9,815,226 B2
(45) Date of Patent: Nov. 14, 2017

(54) METHOD FOR PRODUCING A REINFORCEMENT MEMBER OF COMPOSITE MATERIAL

(71) Applicant: Airbus Operations (SAS), Toulouse (FR)

(72) Inventor: Pierre Estragnat, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 465 days.

(21) Appl. No.: 14/469,999

(22) Filed: Aug. 27, 2014

(65) Prior Publication Data

US 2015/0061187 A1 Mar. 5, 2015

(30) Foreign Application Priority Data

Sep. 3, 2013 (FR) ...................................... 13 58419

(51) Int. Cl.
*B32B 41/00* (2006.01)
*B29C 37/00* (2006.01)
(Continued)

(52) U.S. Cl.
CPC ........ *B29C 37/0075* (2013.01); *B29C 70/446* (2013.01); *B29C 70/462* (2013.01);
(Continued)

(58) Field of Classification Search
CPC . B29C 70/462; B29C 70/446; B29C 37/0075; B29C 70/40
See application file for complete search history.

(56) References Cited

U.S. PATENT DOCUMENTS

2003/0066589 A1* 4/2003 Benson ................ B29C 65/564
156/92
2010/0310818 A1 12/2010 Pridie
(Continued)

FOREIGN PATENT DOCUMENTS

WO 2009044194 4/2009
WO 2009118695 10/2009

OTHER PUBLICATIONS

French Search Report, May 19, 2014.
"Manufacturing processes for advanced composites, Ply Collation: A Major Cost Driver", Campbell, Jan. 1, 2004.

*Primary Examiner* — Galen Hauth
(74) *Attorney, Agent, or Firm* — Greer, Burns & Crain, Ltd.

(57) ABSTRACT

A method for producing a reinforcement member of composite material. The method includes producing a planar preform by stacking sheets of pre-impregnated fibers, heating the preform, and deforming the preform on a mold surmounted by an upper die whose shape confirms to a central portion of the reinforcement member to be obtained. The reinforcement member wings are in contact with the mold at two opposite lateral sides of the upper die after deformation. The deformed preform is also baked. Prior to deformation of the preform, a coating is applied promoting a sliding between the preform and the mold during the deformation. The coating comprises two tear-off strips superimposed on each other. A first tear-off strip is in the form of a pre-impregnated material in contact with the preform and a second tear-off strip is in the form of a dry material superimposed on the first tear-off strip.

8 Claims, 3 Drawing Sheets

(51) Int. Cl.
B29C 70/46 (2006.01)
B29C 70/54 (2006.01)
B29C 70/44 (2006.01)
B29D 99/00 (2010.01)
B29K 105/00 (2006.01)

(52) U.S. Cl.
CPC .......... B29C 70/54 (2013.01); B29D 99/0003 (2013.01); B29K 2105/256 (2013.01)

(56) References Cited

U.S. PATENT DOCUMENTS

| | | | | |
|---|---|---|---|---|
| 2013/0129957 A1* | 5/2013 | Zhao | ........................ | C09J 7/041 428/40.1 |
| 2014/0060732 A1* | 3/2014 | Shair | ........................ | B29C 70/38 156/289 |

* cited by examiner

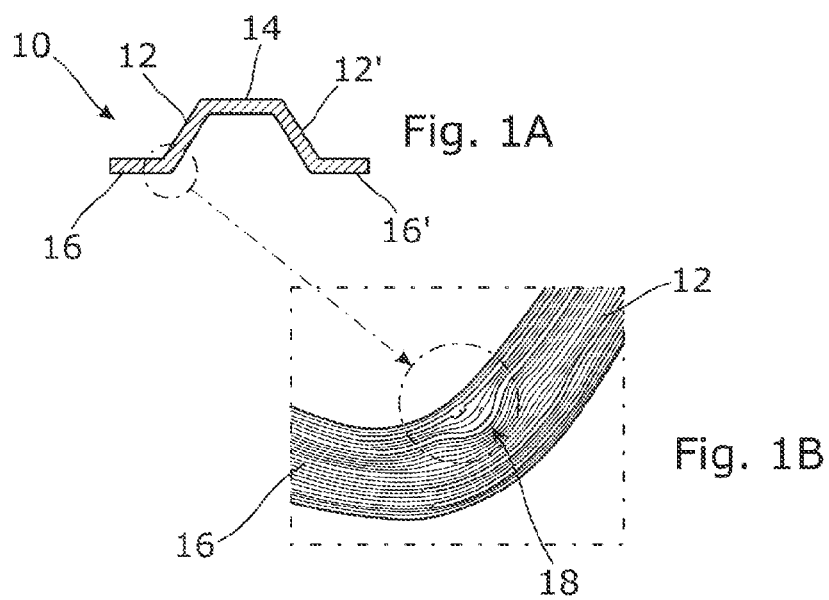
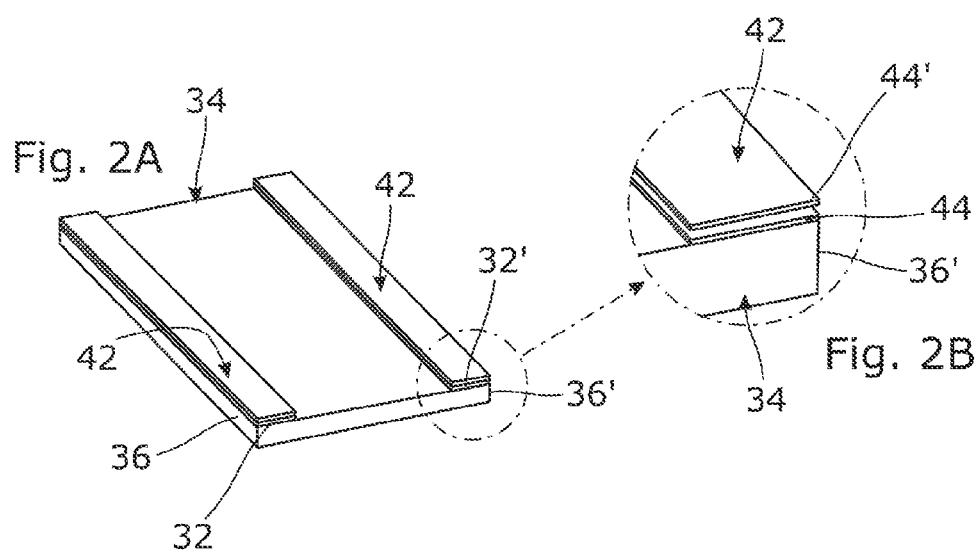
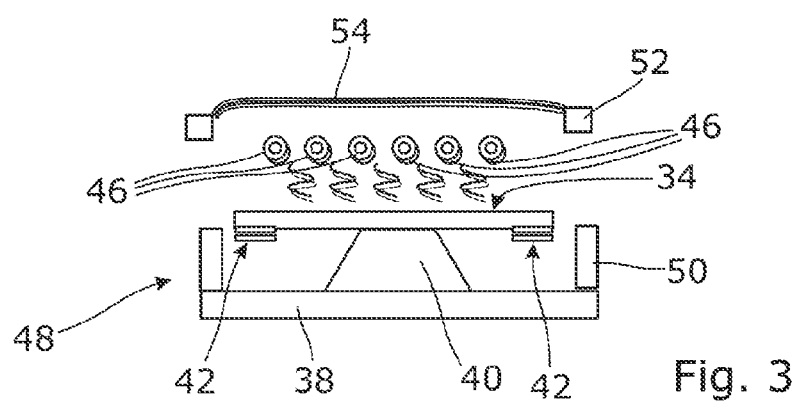

METHOD FOR PRODUCING A REINFORCEMENT MEMBER OF COMPOSITE MATERIAL

CROSS-REFERENCES TO RELATED APPLICATIONS

This application claims the benefit of the French patent application No. 1358419 filed on Sep. 3, 2013, the entire disclosures of which are incorporated herein by way of reference.

BACKGROUND OF THE INVENTION

The present invention relates to a method for producing a reinforcement member of composite material with an omega-like cross section.

In the aeronautical field, reinforcement members are used in order to increase the mechanical characteristics of some elements, such as, for example, the panels which form the fuselage.

In geometrical terms, as illustrated in FIG. 1A, the cross section of a reinforcement member 10 comprises, on the one hand, a central portion in the form of a U or a V, with at least two inclined faces 12, 12' which are optionally connected by means of a central face 14 and, on the other hand, at each side, wings 16, 16' which form abutment surfaces.

In known manner, a reinforcement member of composite material comprises fibers which are embedded in a resin matrix. In accordance with the desired features, the fibers have to comply with specific orientations.

According to a known embodiment, a reinforcement member of composite material is obtained by means of draping sheets or layers of pre-impregnated fibers on a mold which comprises an upper die whose shapes are adapted to the central portion of the reinforcement member.

According to a first operating method, the draping of the sheets of flexible fibers is carried out manually, sheet by sheet, in order to ensure the correct orientation of the fibers of the different sheets and to limit the risks of bridging between the sheets in the region of the connection zones between the inclined faces 12, 12' and the wings 16, 16'.

Subsequently, the stack of the fiber sheets is subjected to a baking cycle. Even if this operating method allows the risks of non-conformity of the reinforcement member to be limited, it is not completely satisfactory since the manual draping operations tend to increase the time and the costs of production.

In the field of draping, there are depositing machines which allow the draping to be automated in order to reduce the time and the production costs.

However, these machines are adapted for depositing sheets in the flat state and are not suitable for depositing sheets on an upper die.

In the field of producing a component of composite material, a technique of hot-forming is known which involves producing a planar preform of fiber sheets using a depositing machine, heating the planar preform to a specific temperature which is lower than the polymerization temperature but which allows the fiber sheets to slide relative to each other, then deforming the preform on a mold in order to obtain the desired form.

This technique cannot be used in this state for producing reinforcement members since it systematically leads to the appearance of a defect 18 (illustrated in FIG. 1B), in particular in the region of the connection zones between the inclined faces 12, 12' and the wings 16, 16'.

SUMMARY OF THE INVENTION

Therefore, an object of the present invention is to overcome the disadvantages of the prior art. To this end, the invention relates to a method for producing a reinforcement member of composite material which is characterized in that it involves:

producing a planar preform by stacking sheets of pre-impregnated fibers, heating said preform, deforming said preform on a mold which is surmounted by an upper die whose shapes are adapted to those of the central portion of the reinforcement member to be obtained, the wings of the reinforcement member being in contact with the mold on both side of the upper die after deformation, subjecting the deformed preform to a baking cycle, prior to the deformation of the preform, applying a coating which promotes the sliding between the preform and the mold during the deformation, said coating comprising two tear-off strips which are superimposed one on the other, a first tear-off strip in the form of a pre-impregnated material which is in contact with the preform and a second tear-off strip in the form of a dry material which is superimposed on the first tear-off strip.

This solution allows a reinforcement member to be obtained without any defect, increasing the production cycles and reducing the production costs.

Preferably, the coating covers at least a portion of each abutment surface and extends for each of them from the lateral edge to the central portion of the planar preform. Advantageously, the coating extends over the entire width of each wing. According to one embodiment, the coating extends only at each wing.

BRIEF DESCRIPTION OF THE DRAWINGS

Other features and advantages will be appreciated from the following description of the invention, which description is given purely by way of example, with reference to the appended drawings, in which:

FIG. 1A is a cross section of a reinforcement member,

FIG. 1B is a section under microscope of a reinforcement member which is obtained in accordance with a method of the prior art and which has a defect, FIG. 2A is a planar preform which allows a reinforcement member which illustrates the invention to be obtained, FIG. 2B is a view which illustrates in detail a portion of the planar preform illustrated in FIG. 2A, FIGS. 3 to 6 are sections illustrating in a schematic manner the different steps for shaping the planar preform illustrated in FIG. 2A.

DETAILED DESCRIPTION OF THE PREFERRED EMBODIMENTS

Figure 7:
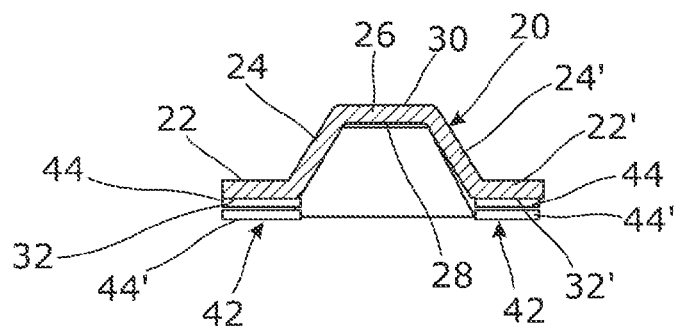
FIG. 7 is a section of a reinforcement member obtained according to the invention during a baking cycle.

FIG. 7 shows a reinforcement member 20 which comprises a non-planar central portion with at one side and the other wings 22, 22' which are capable of being pressed against an element to be reinforced, the central portion being spaced apart from the element to be reinforced.

According to the variants, the central portion may have a U-shaped or V-shaped cross section. According to an embodiment illustrated in FIG. 7, the central portion comprises two inclined faces 24, 24' which are optionally connected by means of a face 26 which is substantially parallel with the wings 22, 22'.

The central portion of the reinforcement member 20 comprises a convex lower surface 28 and a concave upper surface 30, the lower surface 28 and upper surface 30 being spaced apart by a distance corresponding to the thickness of the reinforcement member.

Each wing 22, 22' comprises an abutment surface 32, 32' which extends in continuation of the lower surface 28 of the central portion. The abutment surfaces 32, 32' of the reinforcement member are capable of being pressed against an element to be reinforced.

For the remainder of the description, the longitudinal direction corresponds to the largest dimension of the reinforcement member. A transverse plane corresponds to a plane perpendicular to the longitudinal direction. It corresponds to the plane of section of the FIGS. 2A, 2B, 3 to 8.

The length of the reinforcement member corresponds to the dimension of the reinforcement member in the longitudinal direction.

A width corresponds to a dimension of a portion of the reinforcement member taken in a transverse plane. The deployed width of the reinforcement member corresponds to the sum of the widths of the wings 22, 22' and of the faces 24, 24', 26 which form the central portion of the reinforcement member.

As illustrated in FIG. 2A, a first step of the production method of the reinforcement member involves producing a planar preform 34 which comprises a stack of pre-impregnated fiber sheets.

The planar preform 34 has dimensions which are substantially identical to those of the deployed reinforcement member. In this manner, the planar preform 34 has a length which is substantially equal to the length of the reinforcement member, a width which is substantially equal to the deployed width of the reinforcement member and a thickness which is substantially equal to the thickness of the unprocessed reinforcement member (without any reduction in volume).

Advantageously, the planar preform 34 is obtained by using an automatic draping machine in order to reduce the time and the production costs.

The fiber sheets are deposited in accordance with the desired orientation of the fibers in the reinforcement member.

The depositing machine and the depositing technique are not further described since they are known to the person skilled in the art.

The planar preform 34 comprises two lateral edges 36, 36' which correspond to the ends of the wings 22, 22'.

The method for producing the reinforcement member involves heating the planar preform 34, then deforming it on a mold 38 comprising a planar surface which is surmounted by a male upper die 40 whose shapes correspond to the lower surface 28 of the central portion of the reinforcement member. After deformation, the preform 34 is subjected to a baking cycle. This baking cycle may allow complete or partial polymerization of the reinforcement member to be obtained. It is not further described since it is known to the person skilled in the art.

According to a feature of the invention, the method involves, prior to the deformation of the planar preform 34, applying to at least a portion of the abutment surfaces 32, 32' a coating 42 which promotes sliding between the preform 34 and the mold 38 during the deformation, as illustrated in FIGS. 2A and 2B.

The coating 42 covers at least a portion of each abutment surface 32, 32' by extending for each of them from the lateral edge 36, 36' to the central portion of the planar preform 34. Advantageously, the coating 42 extends over the entire surface of each abutment surface 32, 32', or over the entire width of each wing 22, 22'.

For each wing 22, 22', the coating 42 comprises at least one tear-off strip which is adhesively bonded against each abutment surface 32, 32'.

According to an embodiment illustrated in detail in FIG. 2B, the coating 42 comprises two tear-off strips 44, 44' which are superimposed one on the other, a first tear-off strip 44 in the form of a pre-impregnated material which is in contact with the planar preform 34 and a second tear-off strip 44' in the form of a dry material which is superimposed on the first tear-off strip 44.

The first tear-off strip 44 promotes the fixing of the coating 42 to the planar preform 34 whilst the second tear-off strip 44' promotes the sliding of the preform 34 against the mold 38.

The resin used to pre-impregnate the material of the first tear-off strip 44 must be compatible with the adhesive bonding of the abutment surfaces 32, 32' on an element to be reinforced. According to an embodiment, the material of the first tear-off strip 44 is pre-impregnated with an epoxy resin.

The tear-off strips 44, 44' are peelable after baking.

The tear-off strips 44, 44' are positioned manually. A heating element, such as an iron, can be used to fix the second tear-off strip 44' to the first tear-off strip 44.

After the deformation of the preform 34, the coating 42 is removed. Preferably, the coating 42 is removed after the baking cycle. According to an operating method, the tear-off strips 44, 44' are removed by means of peeling after the baking cycle.

According to an embodiment, as illustrated in FIG. 3, the planar preform 34 is heated, by means of infrared radiation using lamps 46, to a temperature in the order of 80° C.

According to an embodiment illustrated in FIGS. 3 to 6, in order to produce the deformation of the preform 34, there is used a tool 48 which comprises a mold 38 which is surmounted by a male upper die 40 and a peripheral edge 50 and a frame 52 which cooperates with the peripheral edge 50 and which supports a resilient bladder 54.

The tool 48 also comprises sealing means between the peripheral edge 50 and the frame 52 in order to obtain a sealed chamber 56 which is delimited by the mold 38, the peripheral edge 50, the frame 52 and the bladder 54.

It also comprises means for applying the reduced pressure in the chamber 56.

Advantageously, the male upper die 40 is fixedly joined to the mold 38 in a removable manner. In this manner, after deformation, the assembly comprising the deformed preform and male upper die 40 can be placed in a pressure vessel in order to be subjected to the baking cycle.

Whatever the variant, the device for shaping the planar preform 34 comprises means for heating the preform, a mold with an upper die whose shapes correspond to those of a surface of the reinforcement member to be obtained, a bladder which delimits with the mold a chamber in which the planar preform 34 is placed and means for applying the reduced pressure in the chamber.

The deformation phase of the planar preform 34 is described with reference to FIGS. 3 to 6.

As illustrated in FIG. 3, the planar perform 34 is first heated. During this heating phase, the planar preform 34 may be already positioned on the male upper die 40.

When the planar preform 34 is at the necessary temperature in the order of 80° C., the frame 52 is pressed against the peripheral edge 50 in order to enclose the planar preform 34 in the chamber 56.

Figure 4:
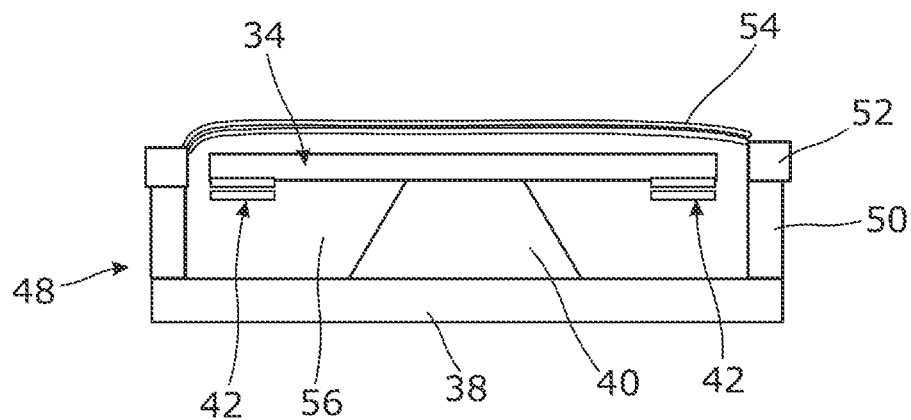
Figure 5:
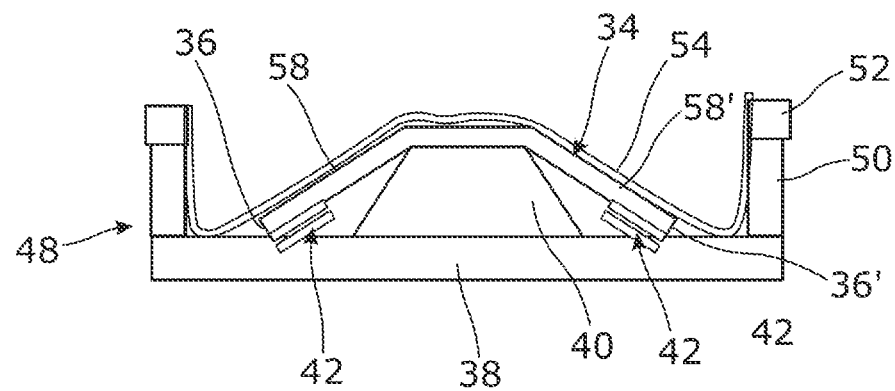
Figure 6:
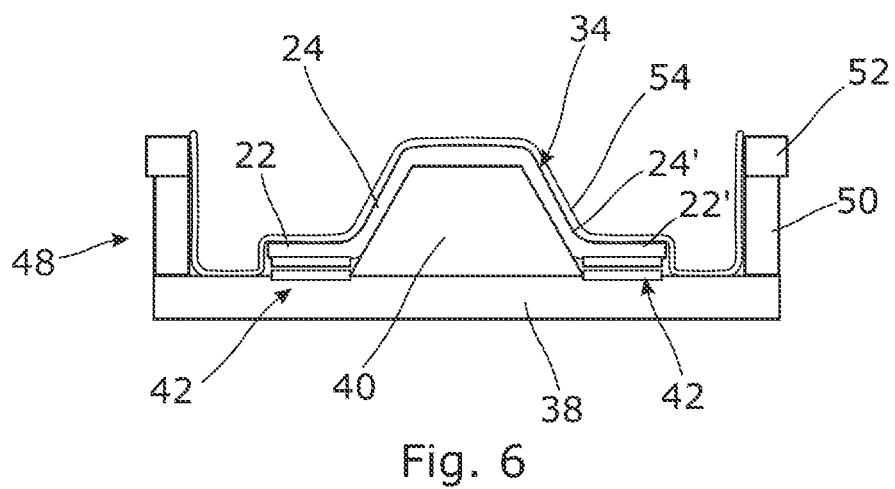

Subsequently, as illustrated in FIGS. 5 and 6, the reduced pressure is applied in the chamber 56 so that the bladder 54 presses the preform 34 against the male upper die 40 and the mold 38.

During this phase of reduced pressure, the bladder 54 deforms the preform 34 so as to form two faces 58 and 58' at one side and the other of the central face 26 in contact with the tip of the male upper die 40. These two faces 58, 58' are progressively folded by the bladder 54 until the ends 36, 36' of the preform 34 come into contact with the mold 38, as illustrated in FIG. 5.

Subsequently, the inclined faces 24, 24' and the wings 26, 26' are progressively pressed against the male upper die 40 and the mold 38 as illustrated in FIG. 6, respectively.

During this phase of formation of the inclined faces 24, 24' and the wings 26, 26' corresponding to the change from FIG. 5 to FIG. 6, the ends 36, 36' then the abutment surfaces 32, 32' must slide on the mold 38.

Figure 8:
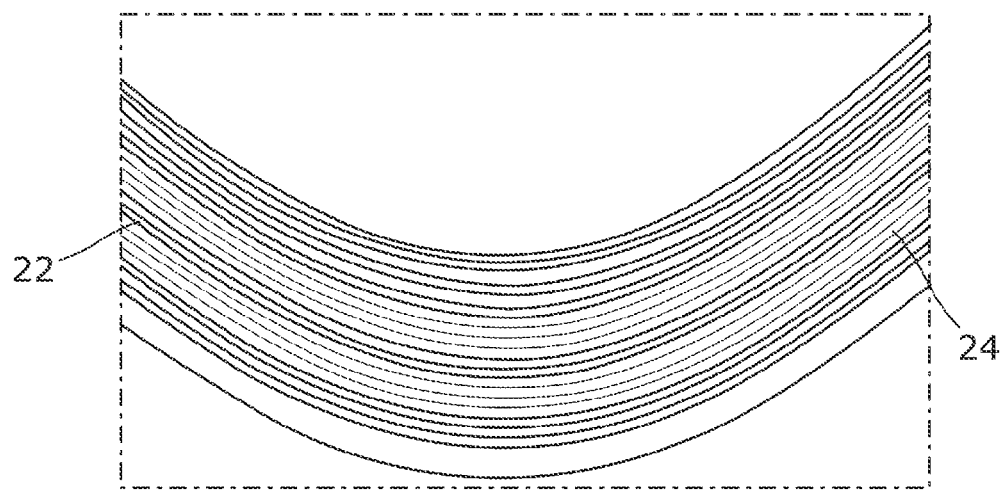
FIG. 8 is a microscopic section of a reinforcement member which is obtained according to the invention and which has no defect.

The coating 42 applied in the region of the abutment surfaces 32, 32' promotes this sliding and prevents the appearance of a defect. In this manner, as illustrated in FIG. 8, the sheets of fibers remain parallel with each other, in particular in the connection zone of the wings and the inclined faces.

In the absence of a coating 42, the adhesion between the mold and the heated preform with pre-impregnated fibers would be too great in the region of the ends 36, 36'. In this manner, the translation movement of the ends 36, 36' during the deformation would bring about a surface resistance which would prevent sliding between the sheets and would bring about the formation of defects 18, as illustrated in FIG. 1B.

After the deformation, the preform deformed with its coating 42 is subjected to a baking cycle on the male upper die 40 in a reduced pressure chamber, as illustrated in FIG. 7, in order to obtain a reinforcement member 20.

After the baking, the coating 42 is removed by means of peeling.

The method of the invention allows a reinforcement member to be obtained without any defect starting from a planar preform which is produced using an automatic sheet depositing machine This solution enables the time and the costs of production to be reduced.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for producing a reinforcement member of composite material with two opposite sides, from a stack of sheets of pre-impregnated fibers, the reinforcement member comprising a central portion at one side and at the other side, wings, which each have an abutment surface, comprising the steps:

producing a planar preform with a central portion and lateral edges by stacking sheets of pre-impregnated fibers, heating said preform, deforming said preform on a mold which is surmounted by an upper die whose shape is adapted to that of the central portion of the reinforcement member to be obtained, the wings being in contact with the mold at one lateral side and another lateral side of the upper die after deformation, subjecting the deformed preform to a baking cycle, prior to the deformation of the preform, applying a coating to said preform which promotes the sliding between the preform and the mold during the deformation, this coating comprising two tear-off strips which are superimposed one on the other, a first tear-off strip in the form of a pre-impregnated material which is in contact with the preform and a second tear-off strip in the form of a dry material which is superimposed on the first tear-off strip, wherein both said first tear-off strip and said second tear-off strip are applied to said preform prior to placement of said preform in the mold, wherein the coating covers at least a portion of each abutment surface by extending from the lateral edge of each abutment surface to the central portion of the planar preform.

2. The method according to claim 1, wherein the coating extends over an entire width of each wing.

3. The method according to claim 1, wherein the material of the first tear-off strip is pre-impregnated with an epoxy resin.

4. The method according to claim 1, wherein the tear-off strips are peelable after baking.

5. A method for producing a reinforcement member of composite material with two opposite sides, the method comprising:

producing a planar preform with a central portion and lateral edges by stacking sheets of pre-impregnated fibers, applying a coating to said preform, the coating comprising two tear-off strips which are superimposed one on the other, a first tear-off strip in the form of a pre-impregnated material which is in contact with the preform and a second tear-off strip in the form of a dry material which is superimposed on the first tear-off strip, heating said preform and said coating, deforming said preform on a mold which includes an upper die having two inclined faces and a top face, wherein the central portion of the planar preform contacts the mold during said deforming, and, subjecting the deformed preform to a baking cycle to form a reinforcement member comprising a central portion at one side and at the other side, wings, which each have an abutment surface.

6. A method for producing a reinforcement member of composite material with two opposite sides, the method comprising:

producing a planar preform with a central portion and lateral edges by stacking sheets of pre-impregnated fibers, applying a coating to said preform, the coating comprising two tear-off strips which are superimposed one on the other, a first tear-off strip in the form of a pre-impregnated material which is in contact with the preform and a second tear-off strip in the form of a dry material which is superimposed on the first tear-off strip, heating said preform and said coating, deforming said preform with a bladder on a mold which includes an upper die having two inclined faces and a top face, wherein during the deforming, the bladder deforms said preform so as to form two faces, each face in contact with one of the inclined faces of the mold, until the lateral edges of the preform with the coating come into contact with the mold, and, subjecting the deformed preform to a baking cycle to form a reinforcement member comprising a central portion at one side and at the other side, wings, which each have an abutment surface.

7. The method of claim 6, wherein once the lateral edges of the preform with the coating come into contact with the mold during the process further includes:

pressing the inclined faces and the lateral edges of the preform with the coating against the mold.

8. The method of claim 7 wherein the lateral edges of the preform with the coating slide while being pressed against the mold.

\* \* \* \* \*